United States Patent
Munakata et al.

(12) 
(10) Patent No.: US 6,613,478 B2
(45) Date of Patent: Sep. 2, 2003

(54) POSITIVE ELECTRODE MATERIAL AND CELL FOR NONAQUEOUS ELECTROLYTE SECONDARY BATTERY

(75) Inventors: Fumio Munakata, Yokohama (JP); Tatsuhiro Fukuzawa, Kanagawa (JP); Yasuhiko Ohsawa, Kanagawa (JP); Yuuji Tanjo, Yokohama (JP); Takuya Mihara, Kanagawa (JP); Takashi Kimura, Kanagawa (JP); Kazuo Sunahara, Kanagawa (JP); Manabu Suhara, Kanagawa (JP)

(73) Assignees: Nissan Motor Co., Ltd., Yokohama (JP); Seimi Chemical Co., Ltd., Chigasaki (JP)

( * ) Notice: Subject to any disclaimer, the term of this patent is extended or adjusted under 35 U.S.C. 154(b) by 207 days.

(21) Appl. No.: 09/791,878

(22) Filed: Feb. 26, 2001

(65) Prior Publication Data
US 2002/0004170 A1 Jan. 10, 2002

(30) Foreign Application Priority Data
Mar. 3, 2000 (JP) ........................... 2000-058093

(51) Int. Cl.$^7$ ............................... H01M 10/24
(52) U.S. Cl. .................................. 429/231.95
(58) Field of Search .............. 429/224, 231.95; 423/599

(56) References Cited

U.S. PATENT DOCUMENTS

| | | | |
|---|---|---|---|
| 5,316,877 A | * | 5/1994 | Thackeray et al. ......... 429/218 |
| 6,071,647 A | * | 6/2000 | Treuil et al. ................ 429/224 |
| 6,168,888 B1 | | 1/2001 | Iwata et al. ............ 429/231.95 |
| 6,190,800 B1 | * | 2/2001 | Iltchev et al. .............. 429/224 |
| 6,399,248 B1 | * | 6/2002 | Hattori ....................... 429/224 |

FOREIGN PATENT DOCUMENTS

| | | |
|---|---|---|
| JP | 2870741 | 1/1999 |
| JP | 11-71115 | 3/1999 |
| JP | 11-73962 | 3/1999 |
| JP | 11-171550 | 6/1999 |

OTHER PUBLICATIONS

Patent Abstracts of Japan, vol. 017, No. 057, Feb. 4, 1993, Hiromitsu Mishima, "Lithium Secondary Battery", 04267053; Sep. 22, 1992; Abstract.

Patent Abstracts of Japan, vol. 018, No. 263, May 19, 1994, Shoji Yamanaka, "Lithium Secondary Battery and Manufacture Thereof", 06044973, Feb. 18, 1994, Abstract.

Ohzuku et al., "LiMnO$_2$ as Cathode for Secondary Lithium Cell", Chemistry Express, vol. 7, No. 3, pp. 193–196, Mar. 1, 1992.

Ohzuku et al., "Comparative Study of Li[Li$_x$Mn$_{2-x}$]O$_4$ and LT–LiMnO$_2$ for Lithium–ion Batteries", Journal of Power Sources, Elsevier, vol. 68, No. 2, pp. 646–651, Oct. 1, 1997.

Zhecheva et al., "Lithium Doping of Cobalt–Nickel Spinel Oxides at Low Temperatures", Materials Research Bulletin, Elsevier, vol. 31, No. 6, pp. 593–602, Jun. 1, 1996.

A. Robert Armstrong et al., "Synthesis of layered LiMnO2 as an electode for rechargeable lithium batteries", Nature, vol. 381, issue No. 6582, Jun. 6, 1996, pp. 499–500; published by Macmillian Magazines Ltd.

\* cited by examiner

Primary Examiner—Randy Gulakowski
Assistant Examiner—Monique Wills
(74) Attorney, Agent, or Firm—Foley & Lardner

(57) ABSTRACT

A positive electrode active material for a nonaqueous electrolyte secondary battery includes at least a lithium-deficient manganese layered composite oxide represented by the general formula Li1-xMnO2-δ. A lithium deficiency quantity x is in the range of $0.03 < x \leq 0.5$. An oxygen nonstoichiometry quantity δ is equal to or smaller than 0.2.

11 Claims, 1 Drawing Sheet

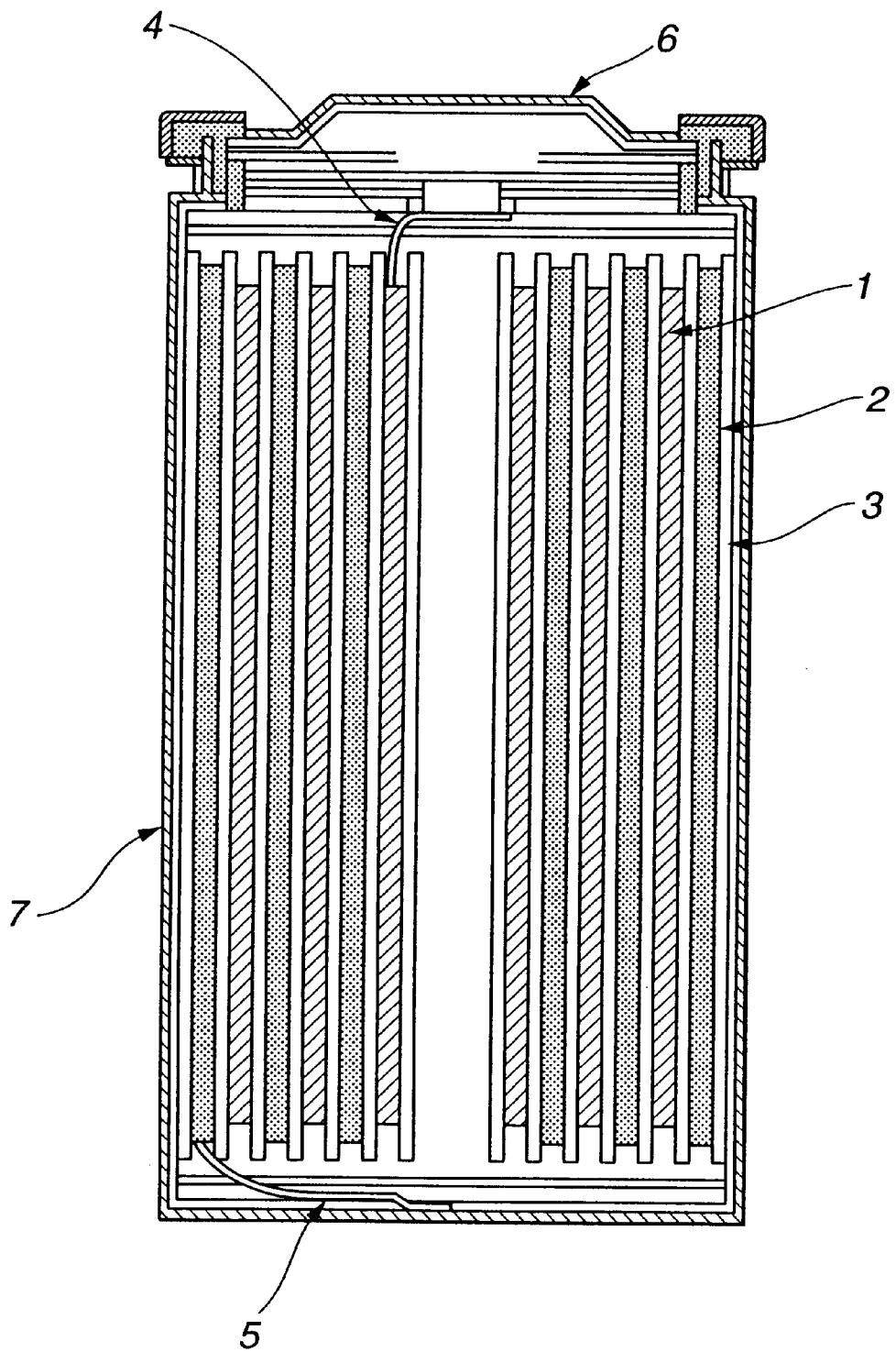

POSITIVE ELECTRODE MATERIAL AND CELL FOR NONAQUEOUS ELECTROLYTE SECONDARY BATTERY

BACKGROUND OF THE INVENTION

The present invention relates to positive electrode active material and lithium secondary batteries. More specifically, the present invention relates to lithium-deficient manganese layered composite oxide advantageous in cycle stability and capacity as compared to a conventional spinel type lithium manganese composite oxide, as positive electrode active material for rechargeable nonaqueous electrolyte secondary batteries, and nonaqueous electrolyte secondary batteries using, as positive electrode active material, such a lithium-deficient manganese layered composite oxide.

Among various rechargeable secondary batteries, the lithium secondary battery with its high charge-discharge voltage and large charge-discharge capacity has shown much promise as source of electricity for electric vehicles to meet the recent intense demand for zero-emission vehicles in environmental problem.

In consideration of some aspects of LiCoO2 such as the stability in operating environment, cost and natural reserves of LiCoO2 used as positive electrode active material for a lithium secondary battery, investigation is currently under way on spinel structure lithium manganese composite oxide (LiMn2O4) as positive electrode active material of a secondary battery for an automotive vehicle. Japanese Published Patent Applications, Publication (Kokai) Nos. 11(1999)-171550 and 11(1999)-73962 show spinel structure lithium manganese composite oxides as positive electrode active material of a secondary battery.

SUMMARY OF THE INVENTION

However, LiMn2O4 as positive electrode active material is deficient in durability at high temperatures and liable to cause deterioration in performance of the negative electrode due to dissolution of the positive electrode material into the electrolyte. To meet these problems, technique is on trial, of substituting various elements such as transition metals and typical metallic elements, for part of Mn. However, the partial substitution of various element for Mn to improve the high temperature cycle durability as disclosed in Published Japanese Patent Application, Publication (Kokai) No. 11(1999)-71115 is liable to cause distortion in the crystal structure and hence deteriorate the cycle durability at room temperature. Moreover, an increase in the amount of substitution for further improvement of the stability of the crystal structure tends to lower the capacity of the active material.

As to the capacity, lithium cobalt oxides (LiCoO2: the active material capacity=140 mAh/g) are higher in capacity than spinel type lithium manganese composite oxides (LiMn2O4: the active material capacity=100 mAh/g). However, lithium cobalt oxides are disadvantageous in the stability etc., as mentioned before. Therefore, a desired positive electrode active material is a high-capacity lithium composite oxide which is higher in the Li content in the crystal structure than the spinel lithium manganese composite oxides (LiMn2O4) and which is superior in stability in operating environment to the lithium cobalt oxides (LiCoO2).

In such a high-capacity type positive electrode active material for a lithium secondary battery, the lithium content in a chemical formula based on the crystal structure is determinative. Japanese Patent 2870741 seeks for a high-capacity Mn-containing lithium composite oxide on the basis of crystal-chemical studies.

A recent report (A. Robert Armstrong & P.G. Bruce "Synthesis of layered LiMnO2 as an electrode for rechargeable lithium batteries", Nature, vol.381 (1996) p499) reveals LiMnO2 layered oxide has a positive electrode active material capacity of about 270 mAh/g, more than twice of that of a conventional spinel structure lithium manganese oxide.

With this layered oxide, a sufficient charge-discharge characteristic is obtainable at 55° C., for example. However, the active material capacity decreases to about one third at room temperature. Moreover, the capacity is decreased gradually by repetition of charge and discharge at temperatures over room temperature, so that the cycle durability is insufficient.

It is therefore an object of the present invention to provide a Mn-containing lithium composite oxide positive electrode active material which is superior in cycle durability and higher in capacity than the conventional spinel structure lithium manganese composite oxide, and to provide a high-performance lithium secondary battery using this high-capacity manganese-containing lithium composite oxide.

According to the present invention, a positive electrode active material for a nonaqueous electrolyte secondary battery comprises: a lithium manganese composite oxide represented by the chemical formula $Li_{1-x}MO_2-\delta$ where a lithium deficiency quantity x is a rational number in the range of $0.03 < x \leq 0.5$ and an oxygen nonstoichiometry quantity $\delta$ is in the range of $\delta \leq 0.2$.

BRIEF DESCRIPTION OF THE DRAWINGS

FIGURE shows a nonaqueous secondary battery according to one embodiment of the present invention.

DETAILED DESCRIPTION OF THE INVENTION

After assiduous studies to meet the problems of the high-capacity layered LiMnO2 type positive electrode active material, the inventors of this application has found new high-capacity Mn-containing lithium composite oxide obtained by voiding part of Li sites in the layered LiMnO2 structure. The obtained Mn-containing lithium composite oxide is superior in cycle stability and higher in capacity than the conventional spinel type lithium manganese composite oxide.

The thus-obtained lithium manganese composite oxide is represented by the chemical formula $Li_{1-x}MO_2-\delta$. In this formula, x is a lithium deficiency quantity which is a rational number in the range greater than 0.03, and smaller than or equal to 0.5, and $\delta$ is an oxygen nonstoichiometry quantity smaller than or equal to 0.2. The lithium manganese composite oxide represented by the chemical formula $Li_{1-x}MO_2-\delta$ is obtainable by removing part of lithium regularly from the stoichiometric composition. Preferably, the lithium deficiency quantity x is equal to a ratio a/b of a first integer equal to or greater than one and equal to or smaller than 30, to a second integer b which equal to or greater than one and equal to or smaller than 30, and which is greater than the first integer a (a<b). The lithium manganese composite oxide represented by the chemical formula $Li_{1-x}MO_2-\delta$ can be a lithium-deficient manganese layered composite oxide which is made deficient in lithium regularly as compared to a stoichiometric composition. A variation width of the lithium deficiency quantity x may be within the range of ±5%.

A nonaqueous electrolyte secondary battery according to the present invention comprises: a negative electrode; and a positive electrode comprising a positive electrode active material which comprises lithium manganese composite oxide represented by the chemical formula $Li1-xMO2-\delta$ where a lithium deficiency quantity x is a rational number in the range of $0.03 < x \leq 0.5$ and an oxygen nonstoichiometry quantity $\delta$ is in the range of $\delta \leq 0.2$. Preferably, the negative electrode comprises at least one selected from the group consisting of Li metal, composite oxide, nitride and carbon.

An ordinary NaCl type MO crystal (where M is metallic element and O is oxygen) such as nickel oxide NiO has a crystal structure of metal (Ni) layers and oxygen layers stacked alternately in the <111> direction. On the other hand, a conventional layered LiMO2 composite oxide (M is Ni, Co or Mn), a layered lithium manganese composite oxide, for example, has a layered structure of oxygen layer-Mn layer-oxygen layer-Li layer-oxygen layer-Mn layer-oxygen layer. The oxygen layers and metal layers are alternated, and the layers having metal elements are orderly arranged in an alternating manner.

Attention has been paid to the ordered structures of these conventional NaCl type MO crystal and layered structure LiMO2 composite oxide which are thought to be very similar in structure, and the inventors of this application has conceived that the layered structure LiMO2 composite oxide is repetition of MO crystal block. The view reached from this notion is that the layered LiMO2 composite oxide has a structure of regular repetition of [LiO][MO] block in which the MO blocks [MO] and LiO blocks [LiO] are arranged alternately.

By applying this view of the block structure, the crystal structure of known sodium manganese oxide Na2/3MnO2 is expressed as [Na2/3O][MnO]. This oxide is considered to have a structure formed by regularly making the Na occupancy in the [NaO] block deficient in the [NaO][MO] block structure. This suggests the possibility of creating a new layered structure lithium manganese oxide.

Such contemplation has been applied to the [LiO][MO] block structure, and the notion reached by the inventors of this application is that it is possible to create new layered lithium manganese composite oxide by regularly making deficient the Li occupancy in [LiO] block.

A positive electrode active material for a nonaqueous electrolyte secondary battery according to the present invention includes at least a lithium-containing manganese composite oxide. The lithium-containing manganese composite oxide is deficient in lithium by a lithium deficiency quantity x, and represented by the general formula $Li1-xMO_{2-\delta}$.

A nonaqueous secondary battery according to the present invention includes at least a negative electrode and a positive electrode including at least such a lithium-containing manganese composite oxide. Preferably, the negative electrode includes at least a negative electrode active material capable of retaining and releasing lithium ions, and the positive electrode includes at least a positive electrode active material capable of retaining and releasing lithium ions. An electrolyte may be a lithium ion conductive nonaqueous liquid electrolyte.

In the general formula $Li1-xMO_{2-\delta}$, the lithium deficiency quantity x is greater than 0.03, and smaller than or equal to 0.5, and the oxygen nonstoichiometry quantity $\delta$ is smaller than or equal to 0.2.

The lithium deficiency quantity x represents an amount of deficient Li deficient as compared to the stoichiometric composition in the lithium-containing manganese layered composite oxide. It is not desirable to decrease the lithium deficiency quantity x too much because of resulting adverse influence on the cycle stability. If the lithium deficient quantity x is smaller than 0.03, the effect of the lithium deficiency is insufficient, and the cycle durability tends to be low. On the other hand, an excessive increase of the lithium deficiency quantity x incurs an undesired decrease in the active material capacity. If the lithium deficiency quantity x is greater than 0.5, the deficiency of lithium below the stoichiometry is too much to secure a sufficient active material capacity.

Preferably, the lithium deficiency quantity x is equal to a ratio (or quotient) a/b (x=a/b). The numerator a is smaller than the denominator b (a<b). Each of the numerator a and the denominator b is a positive integer which is equal to or greater than one and which is equal to or smaller than 30 ($1 \leq a \leq 30$, $1 \leq b \leq 30$). The cycle durability becomes insufficient if the integer a and/or the integer b is greater than 30 or if the integer a and/or the integer b is smaller than one. The crystal structure becomes unstable and the cycle durability becomes poor if the inequality a<b is not satisfied. A composition variation of x is in the range of ±5%. The crystal structure becomes less stable, and the cycle durability becomes insufficient if the variation of x is greater than +5% of if the variation of x is smaller than −5%.

The oxygen nonstoichiometry quantity $\delta$ represents an amount of oxygen defect. If the oxygen nonstoichiometry quantity $\delta$ is greater than 0.2, the crystal structure becomes unstable, and the cycle performance becomes poor. Preferably, the oxygen nonstoichiometry quantity $\delta$ is in the range of $0 < \delta \leq .0.2$.

As a production process for producing the lithium manganese composite oxide according to the present invention, it is possible to employ a process including at least a mixing step of mixing manganese compound and lithium compound homogeneously at a predetermined molar ratio, and a calcining step of calcining the mixture in the atmosphere of low oxygen concentration.

Examples of the manganese compound which can be used in this process are; electrolytic manganese dioxide, chemically synthesized manganese dioxide, dimanganese trioxide, $\gamma$-MnOOH, manganese carbonate, manganese nitrate, manganese acetate. A desirable range of the average particle diameter of the manganese compound powder is 0.1~100 $\mu$m. Preferably, the average particle diameter is equal to or smaller than 20 $\mu$m. If the grain size is too large, the reaction between the manganese compound and the lithium compound becomes very slow, and the homogeneity of the product material becomes lower.

Examples of the lithium compound are; lithium carbonate, lithium hydroxide, lithium nitrate, and lithium acetate. Preferable examples are lithium carbonate and lithium hydroxide. Preferably, the average particle diameter is equal to or smaller than 30 $\mu$m.

The calcination is carried out in an atmosphere of low oxygen concentration. A preferable atmosphere for the calcination is an oxygen-free atmosphere of gas such as nitrogen, argon or carbon dioxide. Desirably, the oxygen partial pressure (or oxygen concentration) in the atmosphere is equal to or lower than 1000 ppm. More desirably, the oxygen partial pressure is equal to or lower than 100 ppm.

A desirable calcination temperature is equal to or lower than 1100° C. More desirably, the calcination temperature is equal to or lower than 950° C. Temperatures above 1100° C. tend to incur decomposition of the product material. Desirably, the calcination time is in the range of 1~48 hours.

More desirably, the calcination time is in the range of 5~24 hours. The calcination may be a single stage calcination or a multi-stage calcination consisting of two or more calcination steps of different calcination temperatures.

It is possible to efficiently lower the oxygen partial pressure in the calcination atmosphere by addition to mixture of lithium compound and manganese compound, of carbon containing compound, preferably carbon powder such as carbon black or acetylene black, or organic substance such as citric acid. The amount of the addition is in the range of 0.05~10%. When the amount of the addition is on the smaller side of this range, the effect is too low. When the amount of the addition is on the greater side, the possibility of byproduct becomes high, and the purity of the target product becomes low because of residue of the additive carbon containing compound.

In the nonaqueous electrolyte secondary battery according to the present invention, it is possible to use, as the material of the negative electrode, any of negative electrode materials for nonaqueous secondary batteries. Examples are; metallic lithium, lithium alloy, metallic oxide such as SnSiO3, metallic nitride such as LiCoN2 and carbon material. Examples of the carbon material are; coke, natural graphite, artificial graphite, and non-graphitizable carbon.

As the electrolytic solution or liquid electrolyte, it is possible to use lithium salt, as electrolyte, dissolved in nonaqueous solvent. Examples of the electrolyte are; $LiClO_4$, $LiAsF_6$, $LiPF_6$, $LiBF_4$, $LiCF_3SO_3$ and $Li(CF_3SO_2)2N$.

As organic solvent, carbonates, lactones, ethers and others are candidates. Examples are; ethylene carbonate, propylene carbonate, diethyl carbonate, dimethyl carbonate, methyl ethyl carbonate, 1,2-dimethoxy ethane, 1,2-diethoxy ethane, tetrahydrofuran, 1,3-dioxolan, and γ-butyrolactone. It is possible to use any one or more of these solvents singly or in combination. The concentration of the electrolyte dissolved in the solvent can be 0.5~2.0 mole/liter.

Besides these examples, it is possible to use solid or viscous liquid of one or more of the above mentioned electrolytes dispersed homogeneously in high polymer matrix. This solid or viscous liquid may be further impregnated with nonaqueous solvent. As the high polymer matrix, it is possible to employ polyethylene oxide, polypropylene oxide, polyacrylonitrile or polyvinylidene fluoride.

It is possible to provide a separator for preventing short-circuit between the positive and negative electrodes. Examples of the separator are; porous sheet and nonwoven fabric of polyethylene, polypropylene, or cellulose.

Practical Examples

In the following practical examples and comparative example, positive and negative electrodes were prepared in the following manner, and encapsulated type nonaqueous solvent battery cells were produced. These practical examples are not exhaustive listings, and the present invention is not limited to these practical examples.

Production of Positive Electrode

Lithium hydroxide monohydrate powder, and dimanganese trioxide powder, were weighed at a predetermined mole ratio, and mixed in a mortar. Thereafter, the mixture was subjected to heat treatment at 900° C. for 12 hours in an atmosphere of argon. After cooling, the calcined product was ground in a mortar. In this way, positive electrode materials having mole ratios of lithium and manganese as listed in Table 1 were obtained.

Production of Cell

Each of the obtained positive electrode materials was mixed with acetylene black as conducting material and PTFE powder as binding material at a weight ratio of 80:16:4. The mixture was molded into a circular disc having a diameter of 12 mm by a pressure of $2t/cm^2$. The molded mixture was subjected to heat treatment at 150° C. for 16 hours to produce a positive electrode disc.

Then, a negative electrode member was formed by compressing lithium metal in the shape of a circular disc having a diameter of 12 mm and mesh-shaped negative electrode collector plate of stainless steel.

As the electrolyte, use was made of a solution of a combined solvent obtained by mixing ethylene carbonate and diethyl carbonate at a volume ratio of 1:1, and $LiPF_6$ dissolved in the combined solvent at a concentration of 1 mole/liter. Polypropylene film was used as a separator.

SUS sheet was used as a collector of the positive electrode. Leads were taken out, respectively, from the positive and negative electrodes, and an element was formed by placing the positive and negative electrode members so as to confront each other across the separator. While being pressed by a spring, this element was interposed between two PTFE plates. Furthermore, the sides of the element were covered by PTFE plates, and a sealed nonaqueous battery cell was completed. The production of the cell was carried out in the atmosphere of argon.

Evaluation

The thus-produced nonaqueous battery cells were examined to evaluate the charge-discharge cycle performance by repetition of charge-discharge cycle at a temperature of 60° C., at a constant current of $0.5$ $mA/cm^2$ in a voltage range from 4.3V to 2.0V. Table 1 shows the number of charge-discharge cycles reached when the discharge capacity decreases below 90% of the initial discharge capacity.

Practical Example 1

By using the block structure [Li1-xO][MnO] along the before-mentioned guiding principle for the active material according to the present invention, $Li0.67MnO2-\delta$ in a row of Table 1 for a first practical example is expressed, in the form of block structure representation taking no account of the oxygen defect (oxygen nonstoichiometry $\delta$), as [Li2/3O][MnO]. In the first practical example, $x=\frac{1}{3}$ (and the oxygen nonstoichiometry quantity $\delta$ is smaller than or equal to 0.2) in the general block structure formula [Li1-xO] [MnO].

Practical Example 2

Similarly, $Li0.83MnO2-\delta$ in the row of Table 1 for a second practical example is expressed, in the form of the block structure representation taking no account of the oxygen defect (oxygen nonstoichiometry $\delta$), as [Li5/6O][MnO]. In the second practical example, $x=\frac{1}{6}$ (and the oxygen nonstoichiometry quantity $\delta$ is smaller than or equal to 0.2) in the general block structure formula [Li1-xO][MnO].

Practical Example 3

$Li0.967MnO2-\delta$ in the row of Table 1 for a third practical example is expressed, in the form of block structure representation taking no account of the oxygen defect (oxygen nonstoichiometry $\delta$), as [Li29/30O][MnO]. In the third practical example, $x=\frac{1}{30}$ (and the oxygen nonstoichiometry quantity $\delta$ is smaller than or equal to 0.2) in the general block structure formula [Li1-xO][MnO].

Comparative Example $Li1.0MnO2-\delta$ in the row of Table 1 for a comparative example is expressed, in the form of block structure representation taking no account of the oxygen defect (oxygen nonstoichiometry δ), as [LiO][MnO]. In this comparative example, x=0 (and the oxygen nonstoichiometry quantity δ is smaller than or equal to 0.2) in the general block structure formula [Li1-xO][MnO].

TABLE 1

| Samples | Mole Ratio | | Composition of Positive Electrode Material | δ | Number of Cycles |
|---|---|---|---|---|---|
| | Li | Mn | | | |
| Practical Example 1 | 0.67 | 1.00 | Li0.67 MnO2-δ | 0.14 | 98 |
| Practical Example 2 | 0.83 | 1.00 | Li0.83 MnO2-δ | 0.05 | 112 |
| Practical Example 3 | 0.967 | 1.00 | Li0.967 MnO2-δ | 0.01 | 76 |
| Comparative Example | 1.00 | 1.00 | LiMnO2-δ | 0 | 10 |

The lithium secondary battery cell of each of the first, second and third practical examples employs, as positive electrode material, a lithium manganese composite oxide represented by the general formula Li1-xMO2-δ. In these practical examples, the lithium deficiency quantity x is a rational number greater than 0.03, and smaller than or equal to 0.5 ($0.03 < x \leq 0.5$). The lithium deficiency quantity x may be a/b where each of the numerator a and the denominator b is an integer equal to or greater than 1 and equal to or smaller than 30, and a<b. The oxygen nonstoichiometry quantity δ is equal to or smaller than 0.2 ($\delta \leq 0.2$). As shown in Table 1, the lithium secondary battery cells of the first through third practical examples are significantly improved in cycle performance as compared to the lithium battery cell of the comparative example. The lithium secondary battery cells of these practical examples are especially suitable for batteries for EV and HEV because of the compactness and prolonged lifetime.

Figure shows a nonaqueous electrolyte secondary battery employing the positive electrode active material in one of the first through twelfth practical example. The nonaqueous electrolyte secondary battery includes a positive electrode 1, a negative electrode 2, a separator 3, a positive electrode lead 4, a negative electrode lead 5, a cover 6 on the positive electrode's side, and a battery casing 7.

Thus, according to the present invention, it is possible to provide a secondary batter which is high in capacity and superior in cycle durability.

This application is based on a basic Japanese Patent Application No. 2000-058093. The entire contents of the basic Japanese Patent Application No. 2000-058093 with a filing date of Mar. 3, 2000 in Japan are hereby incorporated by reference.

Although the invention has been described above by reference to certain embodiments and practical examples of the invention, the invention is not limited to the embodiments and practical examples described above. Modifications and variations of the embodiments and practical examples described above will occur to those skilled in the art in light of the above teachings. The scope of the invention is defined with reference to the following claims.

What is claimed is:

1. A positive electrode active material for a nonaqueous electrolyte secondary battery, the positive electrode active material comprising:
a lithium manganese composite oxide represented by the chemical formula Li1-xMnO2-δ where a lithium deficiency quantity x is a rational number in the range of $0.03 < x \leq 0.5$ and an oxygen nonstoichiometry quantity δ is in the range of $\delta \leq 0.2$.

2. The positive electrode active material as claimed in claim 1, wherein the lithium deficiency quantity x is equal to a ratio a/b of a first integer a selected from natural numbers from 1 to 30, to a second integer b which is selected from the natural numbers from 1 to 30 and which is greater than the first integer a.

3. The positive electrode active material as claimed in claim 2, wherein the lithium manganese composite oxide represented by the chemical formula Li1-xMn2-δ is a lithium-deficient manganese layered composite oxide in which part of Li is removed regularly from a stoichiometric composition, and the lithium deficiency quantity x is controlled.

4. The positive electrode active material as claimed in claim 3, wherein a variation width of the lithium deficiency quantity x is within the range of ±5%.

5. A nonaqueous electrolyte secondary battery comprising:
a negative electrode; and
a positive electrode comprising a positive electrode active material which comprises a lithium manganese composite oxide represented by the chemical formula Li1-xMnO2-δ where a lithium deficiency quantity x is a rational number in the range of $0.03 < x \leq 0.5$ and an oxygen nonstoichiometry quantity δ is in the range of $\delta \leq 0.2$.

6. The nonaqueous electrolyte secondary battery as claimed in claim 5 wherein the negative electrode comprises at least one selected from the group consisting of Li metal, composite oxide, nitride and carbon.

7. The nonaqueous secondary battery as claimed in claim 5 wherein the lithium deficiency quantity x is equal to a ratio a/b of a first integer a selected from natural numbers from 1 to 30, to a second integer b which is selected from the natural numbers from 1 to 30 and which is greater than the first integer a; and
wherein a composition variation of the lithium deficiency quantity x is in the range of ±5%.

8. The positive electrode active material as claimed in claim 1, wherein the lithium manganese composite oxide represented by the chemical formula Li1-xMnO2-δ is a lithium-deficient manganese layered composite oxide.

9. The positive electrode active material as claimed in claim 1, wherein the oxygen nonstoichiometry quantity δ is greater than zero.

10. The nonaqueous electrolyte secondary battery as claimed in claim 5, wherein the lithium manganese composite oxide represented by the chemical formula Li1-xMnO2-δ is a lithium-deficient manganese layered composite oxide formed by controlling the lithium deficiency quantity x so that part of Li is removed regularly from a stoichiometric composition at the time of fabrication, to improve the cycle stability.

11. The nonaqueous electrolyte secondary battery as claimed in claim 5, wherein the negative electrode comprises at least one selected from the group consisting of Li metal, composite oxide, nitride and carbon.

* * * * *